(12) United States Patent
Will

(10) Patent No.: US 6,734,881 B1
(45) Date of Patent: May 11, 2004

(54) EFFICIENT ENTRY OF WORDS BY DISAMBIGUATION

(76) Inventor: Craig Alexander Will, P.O. Box 713, Mi Wuk Village, CA (US) 95346

( * ) Notice: Subject to any disclaimer, the term of this patent is extended or adjusted under 35 U.S.C. 154(b) by 0 days.

(21) Appl. No.: 10/084,265

(22) Filed: Feb. 25, 2002

Related U.S. Application Data

(63) Continuation-in-part of application No. 09/536,859, filed on Mar. 27, 2000, now Pat. No. 6,392,640, which is a continuation-in-part of application No. 09/175,142, filed on Oct. 19, 1998, now abandoned, which is a continuation of application No. 08/423,690, filed on Apr. 18, 1995, now Pat. No. 5,825,353.
(60) Provisional application No. 60/126,742, filed on Mar. 29, 1999.

(51) Int. Cl.[7] ................................................. G09G 5/00
(52) U.S. Cl. ....................................... 345/811; 345/816
(58) Field of Search ................................ 345/810, 811, 345/816, 817, 819, 859, 828, 841, 156, 157, 168, 184

(56) References Cited

U.S. PATENT DOCUMENTS

| | | | |
|---|---|---|---|
| 5,818,437 A | 10/1998 | Grover et al. |
| 6,011,554 A | 1/2000 | King et al. |
| 6,204,848 B1 | 3/2001 | Nowlan et al. |
| 6,392,640 B1 | 5/2002 | Will |

*Primary Examiner*—Regina Liang

(57) ABSTRACT

A method and apparatus for entering words into a computer system. Letters contained in a desired word are entered ambiguously by selecting a group of letters rather than a single letter. Whenever it would be more efficient for the user to unambiguously indicate the letter for a particular letter position than to continue entering ambiguous groups of letters, the user is so notified. The extent to which that this is likely to improve efficiency may also be indicated. The sequence of ambiguous and unambiguous letters for different letter positions is used to retrieve from a dictionary those words consistent with the input and displaying them to the user, who then chooses the desired word. The approach is particularly applicable to very small devices that have a very limited number of keys or space on a display for a virtual keyboard.

18 Claims, 9 Drawing Sheets

EFFICIENT ENTRY OF WORDS BY DISAMBIGUATION

CROSS REFERENCE TO RELATED APPLICATIONS

The present application claims the benefit of the filing date of U.S. provisional application Serial No. 60/126,742, filed Mar. 29, 1999, and is a continuation-in-tart of application Ser. No. 09/536,859, filed Mar. 27, 2000, now U.S. Pat. No. 6,392,640, which is a continuation-in-part of application Ser. No. 09/175,142, filed Oct. 19, 1998, now abandoned, which in turn is a continuation of application Ser. No. 08/423,690, filed Apr. 18, 1995, now U.S. Pat. No. 5,825,353, application Ser. No. 08/423,690 and application Ser. No. 09/536,859 are both incorporated by reference into the present application.

FIELD OF THE INVENTION

The field of the invention relates to the entry of characters, including natural language text, into a computer, particularly a miniature handheld personal digital assistant. More specifically, it relates to a method for improving the efficiency of the entry of text and other character sequences by selecting ambiguous combinations of characters and then later disambiguating them to enter words.

BACKGROUND OF THE INVENTION

As electronic devices get smaller and become increasingly powerful and capable of operation with more flexibility (by, for example, wireless connection to the World Wide Web), there is an increasing need for ways of entering information into miniature handheld devices. Such devices include personal digital assistants, two-way pagers, Web browsers, and the like. They have been described as applying to various platforms, including wristwatches, credit card-sized personal digital assistants, and larger handheld devices such as MP3 music players.

The space available for input on such devices is typically very limited. In cellular telephones, the dialpad has been used for entering text, with some scheme used to indicate which letter is actually desired, given that each key is ambiguous (the "2" key, for example, represents either "A", "B", or "C"). One scheme requires the user to press the key a certain number of times, thus once to enter an "A", twice to enter a "B", or three times to enter a "C". Another scheme, which has been introduced commercially by Tegic Communications (known as "T9") and others, uses a dictionary and software that allows input of a sequence of ambiguous keys and then displays those words that are consistent with the given input, allowing a user to select the desired word from a menu.

The latter scheme is applicable not only to actual physical keys, but to virtual keys that may be defined on a screen and selected with a stylus or other pointing device. The advantage of the use of the scheme for virtual keys is that text entry is often easier than for a full virtual keyboard because the virtual keys can be bigger, leading to fewer errors, and can use less of the area of the display.

This scheme can also be applied to devices smaller than cellular telephones and that have many less keys (real or virtual) than the eight keys used in a cellular telephone to enter text. However, as the number of keys gets smaller, the chances increase that the user must enter a very long sequence of keystrokes before the desired word is displayed, or even that the desired word will never be displayed. Even with the cellular telephone, as the number of words in the dictionary increases, substantial inefficiencies can result because of cases in which creating a sequence of ambiguous designations turns out to be a poor way of indicating a desired word. It is desirable to develop methods that can reduce such inefficiencies.

SUMMARY OF THE INVENTION

The goal of the invention disclosed here is to improve the efficiency of systems for entering information into a computer system based on the entry of sequences of ambiguous items. Each ambiguous item represents one of several possible items, with the actual item entered resolved at a later time.

In such a system, the user typically enters a sequence of ambiguous items and the system determines a list of objects that the user intends, with the objects identified by the sequence of items. These objects are then displayed, and the user selects the intended object, thus removing the ambiguity. Alphabetic text, for example, is entered by selecting sequences of characters to form words. In the present invention, this is done by defining menu items such that each item contains two or more alphabetic letters. Thus, for example, the entire English A–Z alphabet might be represented by 9 menu items, with 8 of the items containing three letters each and the $9^{th}$ item containing two letters.

Users enter words by selecting a sequence of menu items that each contain the desired sequence of letters. After each selection of a menu item, words are retrieved from the memory that are consistent with the sequence entered so far. These words are added to the menu and displayed. When the user sees the word that is desired, he or she moves the thumbwheel so as to designate the desired word, and presses the button to cause it to be selected. The word is then entered.

In the present invention, the efficiency of the system is improved in cases in which resolving the ambiguity for a particular item will reduce the number of possible objects more than entering an additional ambiguous item. When an ambiguous item is entered, a calculation is made of the extent to which resolving the ambiguity for any of the items entered will reduce that number of possible objects, and, if so, that fact is displayed along with, typically, the position involved.

The system is typically used to enter text into a computer system, in which case the ambiguous items comprise a set of two or more letters, and the intended objects are sequences of letters, typically words in a natural language. Other sequences of letters and characters can also be used, and the resulting objects may be Web addresses, electronic mail addresses, or other objects.

The computer system involved is typically that contained in a handheld or desktop device that contains a relatively small keyboard. Such devices include cellular telephones, two-way pagers, Web tablets, personal digital assistants, cordless telephones, and the like.

The keyboard used to select ambiguous items may be composed of real, physical keys, such as the keys used for dialing a cellular telephone that typically are labeled with digits, but that also have an alternative labeling with several letters of the alphabet (e.g., "ABC" associated with the key labeled "2").

The keyboard may also be a virtual keyboard, with the items displayed on a display device such as a liquid crystal display or cathode ray tube. A pointing device such as a mouse, trackball, touchpad, thumbwheel, or head-mounted device may be used to select an ambiguous or unambiguous item for entry.

Typically, the system displays not only the information about whether disambiguating a letter position will improve the efficiency of entry, but the particular position (letter position in a word, if that is what is being entered) and the level of efficiency. The system may be biased such that the information is only displayed if the increase in efficiency is above a given threshold, so as to prevent the user having to take the additional effort to perform such disambiguation if the result is only a small gain in efficiency.

The system is also applicable to the entry of electronic mail and Web addresses that contain special characters, in which case "letters" are not just the alphabet and "words" are not necessarily natural language words or names but any sequence of characters defined in the internal dictionary of the system.

BRIEF DESCRIPTION OF THE DRAWINGS

FIG. 1A shows the system for efficiently composing text as used in a miniature personal digital assistant. FIG. 1B shows the system for efficiently composing text as used in a miniature personal digital assistant, with a display that indicates the extent to which it is desirable to disambiguate a character group rather than enter a new character group.

FIG. 3A shows the overall organization of the data structure for one example word input case. FIG. 3B shows the data structures for the list of words for a particular context and for the dictionary of words.

DETAILED DESCRIPTION OF THE INVENTION

Definitions

A "character group" is a set of two or more characters that, when selected, ambiguously describes a character contained in a word that a user intends to enter. A user selects a character group with the intention of selecting one of the letters contained in the character group. The character group may be displayed on a screen and selected by moving a designation to the character group and then selecting it by pressing a button or other means of closing a switch. It may be displayed on a touch-sensitive screen and selected by the user touching the screen. It may be associated with a key or button that, when pressed or touched, selects the character group. The character group remains ambiguous until either the intended word or a specific letter is selected by the user to resolve the ambiguity.

A "word" is any ordered sequence of characters followed by a delimiting character. Usually, the characters are letters of the alphabet, and, usually, the delimiting character is a space. In cases such as entry of an electronic mail address or Web address, a "word" may be defined as a complete such address, including such special characters as "@" (at sign), "." (period), ":" (colon), "/" (slash), "-" (dash), and the like. A word may represent meaning in a written language, or be the name or part of the name of an individual or other entity. It may also be an address, such as that of a Web site or electronic mail address.

"Text" is one or more words, usually (but not always) separated from each other by a space. Text usually refers to natural language text, but does not always.

A "letter" is any displayable character, although it usually refers to letters of the alphabet.

In this application, reference will be made to the entry and editing of text, words, and letters. For clarity, these terms will be used and the context of entering natural language text by defining natural words composed of letters of the alphabet will be assumed. However, it should be recognized that these descriptions are used to allow concreteness and easy understandability, and that the same discussion will usually apply to other applications in which text is not natural language, words do not have ordinary meaning, and letters are not letters of the alphabet.

An "item" is an entity contained in a list (usually an ordered sequence) of entities. Each entity has a displayable representation to allow display and selection of the item.

A "button" is any object that, when pressed, transmits an indication of such to a microprocessor.

System as Seen by the User

Figure 1A:
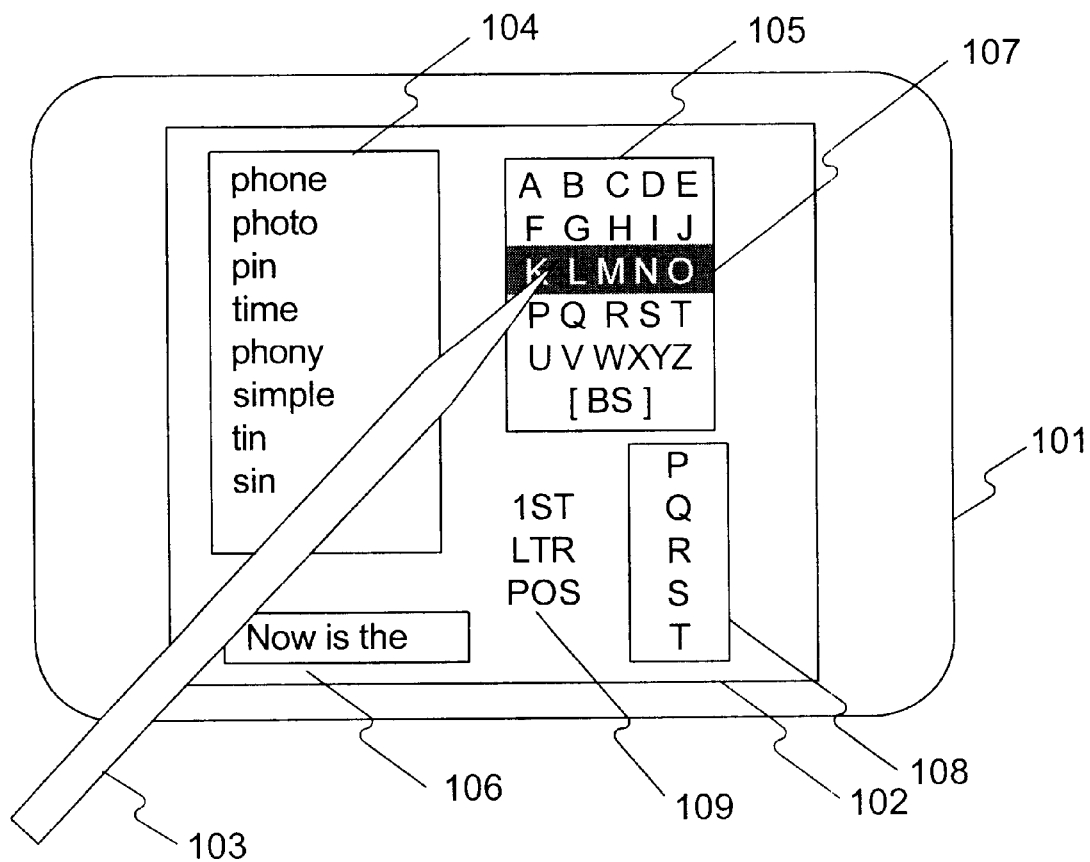
FIGS 1A and 1B show how the system appears to the user.

FIG. 1A shows the system for efficiently composing text as used in a miniature personal digital assistant. In this device 101 a liquid crystal diode is used for a display 102, and a stylus 103 serves as the sole input device. Pressing the stylus 103 to the screen 102 appropriately allows scrolling through menus and text and selection of an item. This device is the size of a credit card, and is typically used to enter, organize, and maintain names, addresses, and phone numbers, "to do" lists, and to take notes. The same method and device can also be used in conjunction with a two-way alphanumeric pager or other wireless communications device, with the method of particular value for creating a new message or sending a response to a received message.

The display shows the device in the mode in which a word is being entered. In the example, the user is attempting to enter the word "time". This display is organized so as to have five menu items, with roughly five letters per item. (Four items have five letters, a fifth has six letters). Each such item is termed in this specification a "character group" according to the definitions provided above. The organization of the character groups is in terms of alphabetical order. The display is organized in two columns 104 and 105, plus a field across the bottom 106 to accumulate text. At the column at the right 105, a part of the menu is shown that presents characters to be entered. At the column at the left 104, words that have been retrieved from memory that are consistent with the sequence of menu selections that have been entered so far for this word are displayed. Note that one of the menu items 107 for (ambiguous) letter selection is designated as different from the remainder, in this case shown in reverse video. Alternately, the designation can involve drawing a rectangle (or other geographic shape) around the menu item or placing a symbol (such as an arrow) adjacent to the designated item.

In the example given, three items, or character groups, have already been entered, "PQRST", "FGHIJ", and "KLMNO". The system's memory is searched for those words in which the first three letters are consistent with the sequence of letters that have been selected, and displays them in the left column menu 104. (See below for a description of the decision tree mechanism allowing quick search of the memory allowing real-time display). The order of display is that of frequency of use in the English language (or other language, if not English). (The examples shown are for illustration are not necessarily in order of actual word frequency). The menu 104 thus indicates those words consistent with these inputs. This includes the target word "time", although this is for convenience in understanding the operation of the device. In a real example, the word "time" would not be listed, even though it would be in the list of words consistent with the input, because it would be sufficiently low frequency to be so low in the list as to not be displayed. The purpose of the method described here is to most efficiently cause that word to be displayed so that it can be selected.

For more information about the basic operation of the character disambiguation system in a personal digital assistant and its use in editing text, see U.S. patent application Ser. No. 09/536,859.

The display 102 also contains a menu 108 allowing the user to disambiguate a particular character group already entered. This menu 108 is typically only displayed in circumstances where it is advantageous for the user to perform this disambiguation. In addition, the best character group for disambiguation is chosen for display, and the letter position corresponding to the character group is indicated 109.

Note that there are five (or six, in one case) letters in each character group (item) that can be selected. In this case, it is usually better—that is, more efficient—to disambiguate an existing letter rather than enter a new letter more than half the time—particularly given that the system requests a disambiguation of only that character group that has the greatest effect. This of course ignores the extra overhead of moving the designation away from the character groups to the specific letters, and the mental effort required to monitor whether such a disambiguation request is being made and determining which letter in the sequence is being requested.

After each character group has been entered, those words consistent with the sequence of character groups are retrieved from the memory. (Part or all of these words are eventually displayed on the screen). In general, for systems with reasonably large numbers of keys such as a telephone keypad, the easiest way for the user to further disambiguate the sequence that has been entered—should the list of words displayed be too long to scroll through effectively) is to enter an additional character group, that is, ambiguous group of letters. This of course depends in part upon the configuration of menu items—the number of items and the number of letters contained in each item. If there are, for example, nine character groups, with each character group containing three letters (except for a single character group that contains two letters, to get a total of 26), then an additional entry of a character group has relatively high information value, considerably more on the average that of that of disambiguating an already-entered group of 3 letters to a particular letter. (An easy way to think of this is that any choice-e.g., a key being pressed-reduces the space of words being searched. If there are three possible choices, choosing one reduces the space by, on average, two-thirds. If there are nine choices, the space is, on average, reduced by eight-ninths.) (This is on the average-it depends greatly on the particular sequences and words involved). However, if there are only five character groups (five letters per item, except for one that has six), disambiguating a randomly selected already-entered character group has roughly the same information content as entering a new character group. When the number of letters per character group is greater than the number of character groups, the amount of information resulting from disambiguating an already-entered character group is greater than that of entering a new character group.

Figure 4:
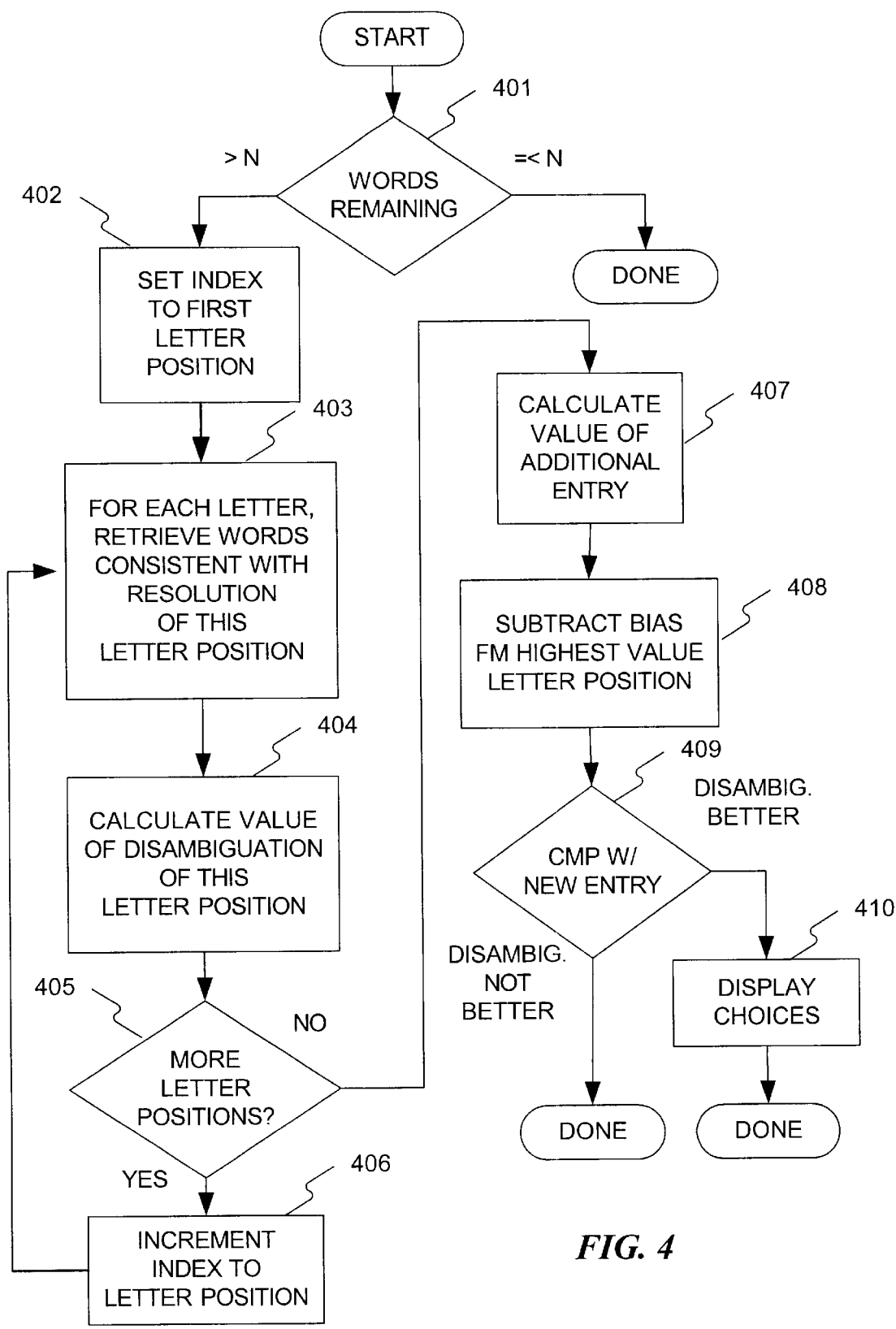
FIG. 4 shows a flowchart of the procedure for handling dynamic requests to the user for disambiguation of a particular character group.

If the system is designed so as to request such disambiguation dynamically, the disambiguation becomes much more favorable, even in cases where relatively few letters are contained in a character group. This is for two reasons. First, the system can request that the user disambiguate that previously entered character group that would do the most to reduce the search space. Second, the system can request a disambiguation only when it is desirable—when, given the particular sequence entered and the words being retrieved result in it being a more efficient thing to do compared with entering an additional character group. The flowchart in FIG. 4 shows the procedure for determining when disambiguation is desirable and which item is the best to be disambiguated.

Figure 1B:
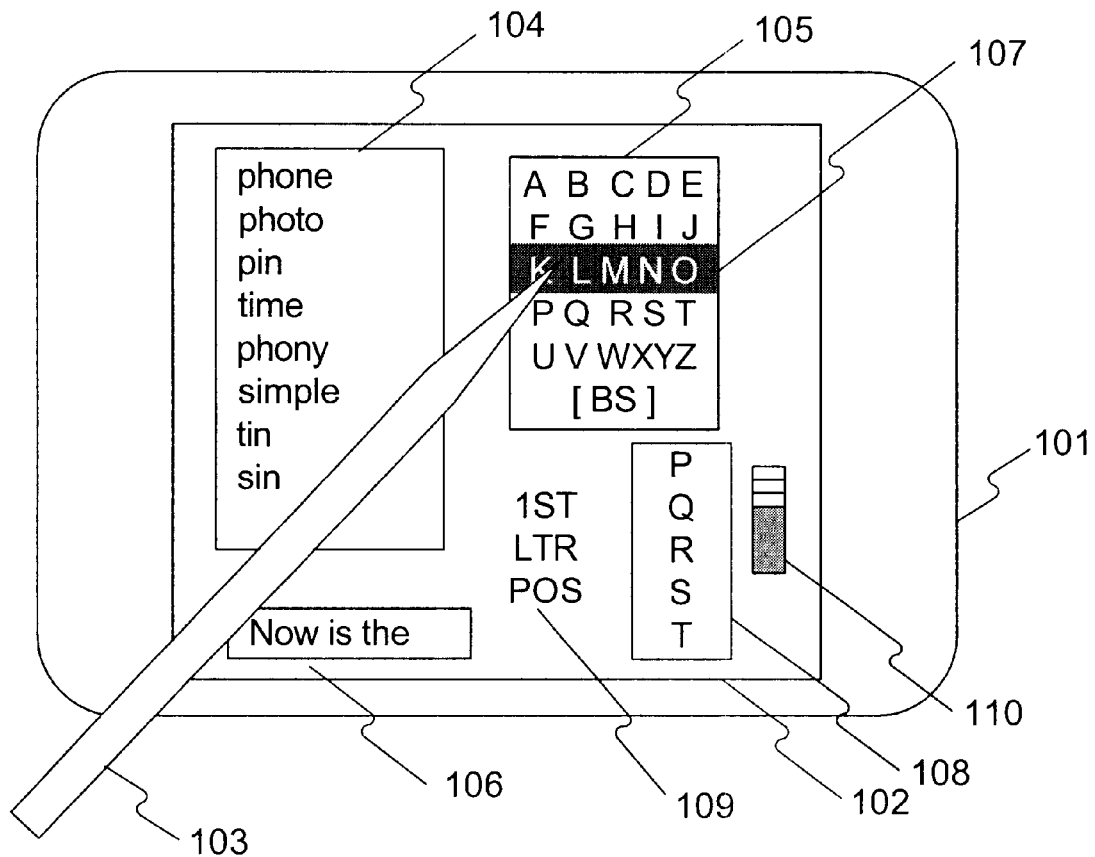

FIG. 1B shows the system for efficiently composing text as used in a miniature personal digital assistant, with a display that indicates the extent to which it is desirable to disambiguate a character group rather than enter a new character group. The display 110 shows the value, in a bar graph form, of entering the letter rather than a new ambiguous item. This is particularly useful in an adaptive system. In such a system, when the user begins using the device, the bar graph is always displayed, and responses from the user are recorded along with the value of the bar graph. After sufficient data has been collected, and it is clear for what threshold the user prefers to choose entering a new character group to disambiguating an old one, the presentation of the option to disambiguation can be suppressed in situations below this threshold.

It is also possible for a screen to be arranged such that the individual letters are contained as part of a larger, scrollable menu. An unusual aspect of the scrollable menu is that the 3 items included have, to the left, ("$2^{nd}$ letter") a label indicating information necessary to determine what response is desired if these items are chosen. The label also scrolls with the menu but is not actually part of it (does not get designated).

The method for disambiguation by letter described here is applicable to devices that use a wide variety of input mechanisms. It is applicable to devices that use keys, touchscreen displays, joystick-operated displays, and "soft" keys. In some cases, such as miniature personal digital assistants that have a limited number of soft keys, the labels for the keys are only displayed in response to the user deciding, typically in response to a display indicating that letter disambiguation is desirable, to enter a letter unambiguously, which will typically replace the ambiguous keyboard with the (narrower options) unambiguous keyboard for the single selection required.

Hardware Architecture

Figure 2:
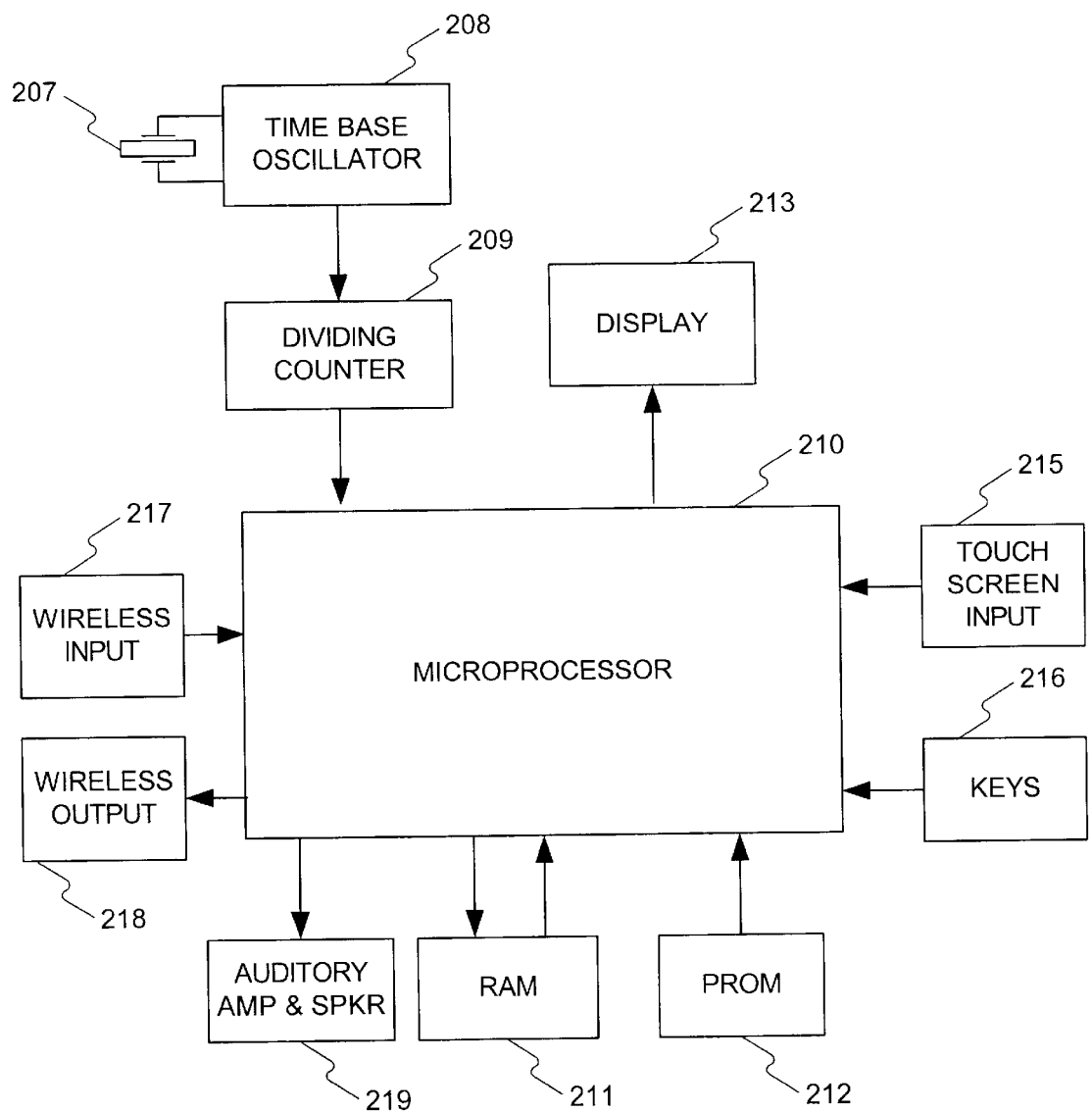
FIG. 2 shows the hardware architecture for the personal digital assistant.

FIG. 2 shows the hardware architecture for the personal digital assistant. A crystal 207 and associated time base oscillator 8 produces a sequence of pulses driving a frequency dividing counter 209 with a 76.8 kHz output frequency. The pulse stream is read into the microprocessor 210, via a program interrupt, which uses this information to update software counters kept in random access memory 211 (RAM) that control all timing functions, and to control infrared communications. The software program controlling the microprocessor 210 is contained in a programmable read only memory 212 (PROM). A display 213 contains a memory, address logic, display drivers, and optoelectronics for display of the characters and other symbols, in the form of binary pixels. A touch screen input device 215 operated by the user's finger or a stylus indicates when, and where, the display is touched. A set of keys 216, if used, indicate when a key is moved and generates a pulse that is transmitted to the microprocessor 210.

A wireless input device 217 receives energy (e.g., radio, infrared) from a connection with a network interface for receiving data (and acknowledgements) and a wireless output device 218 transmits data to a network interface (and receives acknowledgements). An audio amplifier and speaker 219 allows "beep" signals to be generated. The auditory amplifier can also be used to automatically dial a telephone (though the handset microphone) when the number has been retrieved from a telephone directory, if that application is included in the unit. Note that the infrared detector and emitter (or radio equivalent) are optional, used only if it is desired to access information from a remote source, such as an accompanying memory device (e.g., PC with hard drive or CD-ROM), or from a connection to the Internet.

Data Structure for Input of Words

Figure 3A:
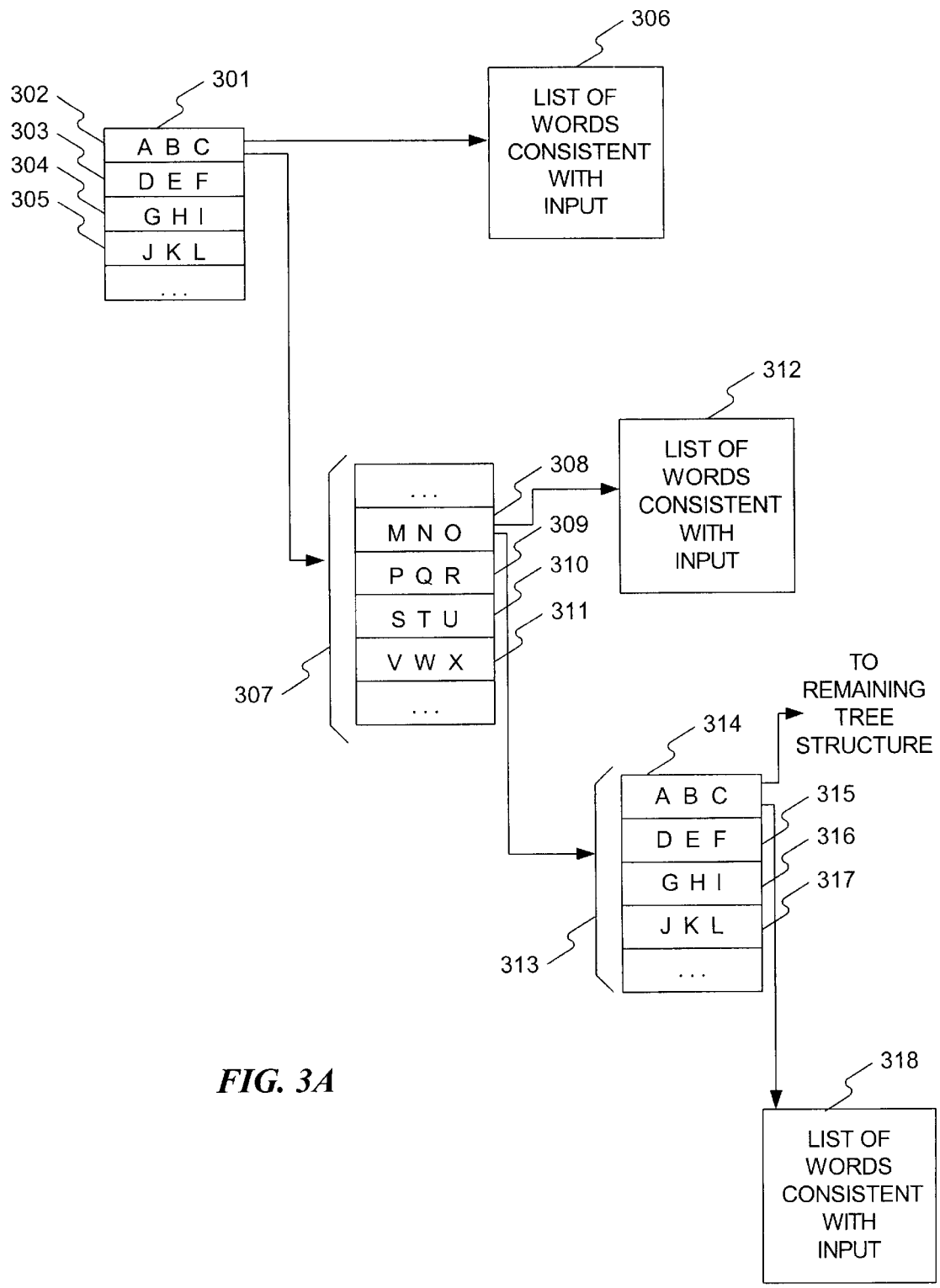
FIGS. 3A and 3B show the data structures involved in the input of words using the rotating cylinder.
Figure 3B:
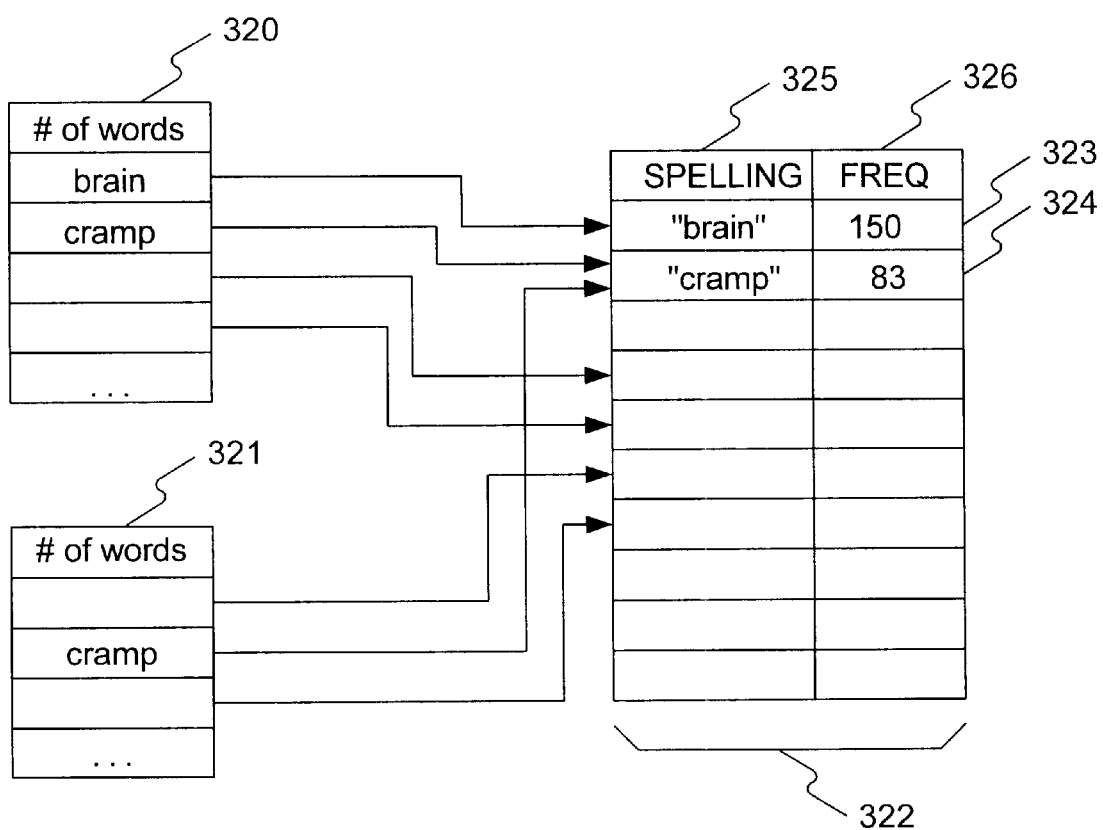

FIGS. 3A and 3B show the data structures involved in the input of words using the rotating cylinder.

FIG. 3A shows the overall organization of the data structure for one example word input case. This is in effect a list, or database, of words, that has indexes that have been precompiled to allow very rapid access of words consistent with a particular sequence of character group inputs that have been entered. The structure has a tree structure, with a particular path through the tree corresponding with a particular sequence of character group inputs. For clarity, only those parts of the tree structure necessary to input the example word "brain" are shown. Note, however, that, for example, each field in each data structure that represents a particular context and associated character group will have (with only a very few exceptions) pointers to a list of words and to a further part of the structure.

This structure also assumes a set of character groups defined as "ABC", "DEF", "GHI", "JKL", and (not shown) "MNO", "PQR", "STU", "VWX", and "YZ". Data structure 301 contains a field 302 through 305 for each character group, including 302 for "ABC", 303 for "DEF", 1304 for "GHI", and 305 for "JKL". This structure 301 is associated with the context in which only one character group has been entered, with each field corresponding to a particular potential character group. Each field contains two pointers. One pointer points to a list of words 306 consistent with the character groups input so far. A second pointer points to a data structure 307.

This data structure 307 is associated with the context in which a second character group has been input, which contains a field 308 through 311 for each input character group, where the character groups shown are "MNO", "PQR", "STU", and "VWX". Note that for the input word "brain" the first character group entered was "ABC" and thus the second character group will be "PQR" from structure 307. Note that each of the character groups in structure 307 also has pointers to corresponding lists of words analogous to 306 and to corresponding further data structures in the tree, although for clarity they are not shown in the present figure. For the field 308 in data structure 307 there are two pointers, one to a list of words 312 consistent with the two character groups entered so far—"ABC" and "PQR", and the other to a further part of the tree structure, data structure 313.

Data structure 313 is associated with the context in which a third character group has been input, which contains a field 314 through 317 for each character group, where the character groups shown are "ABC", "DEF", "GHI", and "JKL". Again, for the input word "brain", the character input groups will have been "ABC", "PQR", and, again, "ABC". The field 314 for "ABC" contains a pointer to a list of words 318 consistent with the three character groups that have been entered so far, and also contains a second pointer to a further structure in the tree that is not shown.

The mechanisms described for retrieval of words are similar to those used in the invention described in the published PCT application WO 98/33111 by King, et al, and assigned to Tegic Communications. It is also described in U.S. Pat. No. 5,818,437 to Grover, et al., also assigned to Tegic Communications. These applications assigned to Tegic are incorporated by reference into the present application.

FIG. 3B shows the data structures for the list of words for a particular context and for the dictionary of words. Lists of words for two contexts 320 and 321 are shown, with each including a count of the number of words and, for each word, a pointer to the corresponding word in a common dictionary representation 322. The point is kept rather than the spelling of the word itself to conserve memory. For example, the word "brain" is represented 323 in the dictionary, as well as the word "cramp" 324. Each dictionary item contains two fields, one indicating the spelling 325 of the item and the other indicating the relative frequency 326 of the word's use in the context that it is used in (e.g., natural language text, or frequency of use of an electronic mail address as calculated by a program that monitors the number of mail messages sent to a particular person. In use, when a user enters a character group, a list of,words is retrieved and then, for each word in the list, the frequency is retrieved and used to order the list, along with other criteria such as more recent use that may be stored in the particular system. The list of words when precompiled can also be in order of frequency of use. The spelling of each word is also retrieved and used to display the word.

Procedure for Disambiguation by Letter

FIG. 4 shows a flowchart of the procedure for handling dynamic requests to the user for disambiguation of a particular character group. The system first compares 401 the number of words remaining (that is, either displayed or available for display), given the sequence of character groups entered so far, with a constant N. This constant is set such that if there are so few words that it is easier to scroll through and select one than to disambiguate an item, there is no attempt made at disambiguation by the user. N is generally about ten to twenty, depending upon the size of the display. If the number of words remaining is less than or equal to N, then no disambiguation by the user is requested and the procedure is done. If the number of words remaining is greater than N, a calculation is first made, for each letter position, of the value of disambiguating the character group entered for that letter position. This is carried out by first setting an index 402 to the first character group in the sequence that has been entered. Then, for each letter contained in the character group in the particular letter position, those words containing that letter in the particular letter position are retrieved 403. A calculation is made 404 of the amount that the number of remaining words is reduced if that letter is selected, according to the formula: amount of reduction=(number of words before selection−number of words after selection)/number of words before selection. In addition, a running sum of the number of words retrieved after each letter selection is kept. The value of disambiguation of this letter position is then calculated. This is done as follows: For each letter that could be selected in the letter position, the words consistent with that letter are retrieved. For each word, the amount of reduction of words for the particular letter (calculated above) is multiplied by the frequency of occurrence for that word. The result is summed across all words for the letter, and eventually all words for all letters in the character group. This gets a measure of value of selecting that letter, normalized by the likelihood that the user would actually choose the words remaining after disambiguation of the letter (and thus the letter itself, in this context).

In algorithmic language, the calculation for each letter position is as follows:

```
BEGIN
NwordsTotal = 0;
For i = 1 to Nletters
    BEGIN
    Reduction[i] = (NremainingBefore − NremainingAfter[i])/
       NremainingBefore[i];
    NwordsLetter[i] = NremainingAfter;
    NwordsTotal = NwordsTotal + NwordsLetter[i];
    END
SumValue = 0;
For i = 1 to Nletters;
    BEGIN
    For j = 1 to NwordsLetter[i]
        BEGIN
        SumValue = SumValue + (Reduction[i] * Frequency_word;)
        END
    END
Value = SumValue/NwordsTotal;
END
```

Where

NwordsLetter[i] are the number of words remaining after a letter i has been selected.

NwordsTotal is the sum of NwordsLetter[i] for each letter.

Nletters is the number of letters in the character group.

NremainingBefore is the number of words remaining after the existing sequence of character groups has been entered, but before any disambiguation to a particular letter within a character group.

NremainingAfter[i] is the number of words remaining after the existing sequence of character groups has been entered and after the entry of a particular letter i within a character group.

NwordsLetter[i] is the number of words remaining after entry of a particular letter i.

NwordsTotal is the sum total of the number of different words remaining after each letter has been selected, one at a time, to disambiguate the letter position in question.

Frequency$_{word}$ is the frequency of occurrence for the word retrieved from memory.

SumValue is a running summation of the normalized value contribution contributed by each possible target word.

Value is the calculation of the value of selecting a particular letter of a character group.

The theory of the calculation is based on simulation. For each letter selection, we identify a target word that we assume the user intends to enter. We determine the amount of reduction of words attributed to the letter selection that produced the target word, and multiply it by the word frequency because this tells us how likely (compared to other letters, other letter positions, and the entry of a new character group) that aspect of the simulation is, and therefore how much it should have an impact on the value.

(Note in the above that it is possible to implement the above procedures in a somewhat more computationally efficient manner, for example by first summing the word frequencies for all words consistent with a particular letter (in the case of the first algorithm), then multiplying by the amount of reduction of words resulting from selecting that letter. The procedures described here are shown for clarity of understanding the basic approach, and changes to improve the efficiency of computation can be done by programmers with ordinary skill in that art.

A test is then made 405 of whether there are more letter positions for which calculations need to be made. If yes, the index to the letter position is incremented 406, and control is passed to the step of retrieving words consistent with resolution of this letter position. If there are no more letter positions, control passes to the step of calculating the value of an additional entry of an character group 407. This is done as follows: For each character group that the user might enter, a calculation is made of the number of remaining words after the entry is made, and then a calculation of the amount of reduction of words resulting from the entry. When the amount of reduction is known for each character group, a calculation is then made as follows: For each character group, the words remaining after selection of that item are identified, and the frequency of occurrence for each word retrieved from memory. The amount of reduction resulting from the selection of that character group is then multiplied by the word frequency for each word. The result of each multiplication is summed across all words for that character group. The resulting sums for each character group are then summed across all character groups. The sum of multiplications across all character groups is then divided by the sum total number of words remaining after any selection of an character group.

In algorithmic language, the calculation for the value for entering a new character group is as follows:

```
BEGIN
NwordsTotal = 0;
For i = 1 to NalphaItems
    BEGIN
    Reduction[i] = (NremainingBefore − NremainingAfter[i])/
       NremainingBefore[i];
    NwordsalphaItem[i] = NremainingAfter;
    NwordsTotal = NwordsTotal + NwordsalphaItem[i];
    END
SumValue = 0;
For i = 1 to NalphaItems;
    BEGIN
    For j = 1 to NwordsalphaItem[i]
        BEGIN
        SumValue = SumValue + (Reduction[i] * Frequency_word;)
        END
    END
Value = SumValue/NwordsTotal;
END
```

Where

NwordsalphaItem[i] are the number of words remaining after a new character group has been selected.

NwordsTotal is the sum of NwordsalphaItem[i] for each letter.

NalphaItems is the number of letters in the character group in the next entry to be made.

NremainingBefore is the number of words remaining after the existing sequence of character groups has been entered, but before any additional character groups are entered.

NremainingAfter[i] is the number of words remaining after the entry of a new character group.

NwordsalphaItem[i] is the number of words remaining after entry of a particular character group i.

NwordsTotal is the sum total of the number of different words remaining after each character group has been selected, one at a time, to further disambiguate the word being entered.

Frequency$_{word}$ is the frequency of occurrence for the word retrieved from memory SumValue is a running summation of the normalized value contribution contributed by each possible target word.

Value is the calculation of the value of entering a new character group.

The letter position that has the highest value for disambiguation is then selected, and a bias subtracted 408 from it. The bias is empirically determined and reflects the greater effort of entering a letter as opposed to a new input character group—the user must determine what corresponds to the letter position asked for, and move the thumbwheel so as to designate the letter desired. The remaining value is compared 409 with the value for making a new character group entry. If the value for making a new entry is higher or equal, the procedure is done. If the value for disambiguating an existing entry is higher, the letter choices are displayed 410 and the procedure is done.

Mechanism for Retrieval of Words

The words are retrieved from a memory containing a list of words together with an associated word frequency, that initially is obtained from analysis of large amounts of text. This is available from standard sources, including the corpus developed at Brown University by Kucera and Francis. (See *Computational Analysis of present Day American English*, by Henry Kucera.) It is also available in print form, such as in *The American Heritage Word Frequency Book*.

The specific mechanism for real-time retrieval requires a design optimized for such searching. This is typically done as a decision tree, in which a predetermined sequence of tests are made on a newly entered character group when that character group is entered. Thus, when the first character group is entered, a decision tree looks at the character group and, on the basic of which character group it is of the possible character groups, is directly referred by a software "pointer" to those words consistent with the entry of the item that has been entered, which can then be retrieved and displayed. When the second character group is entered, the system goes another level down the decision tree.

Alternative Platforms

Figure 5:
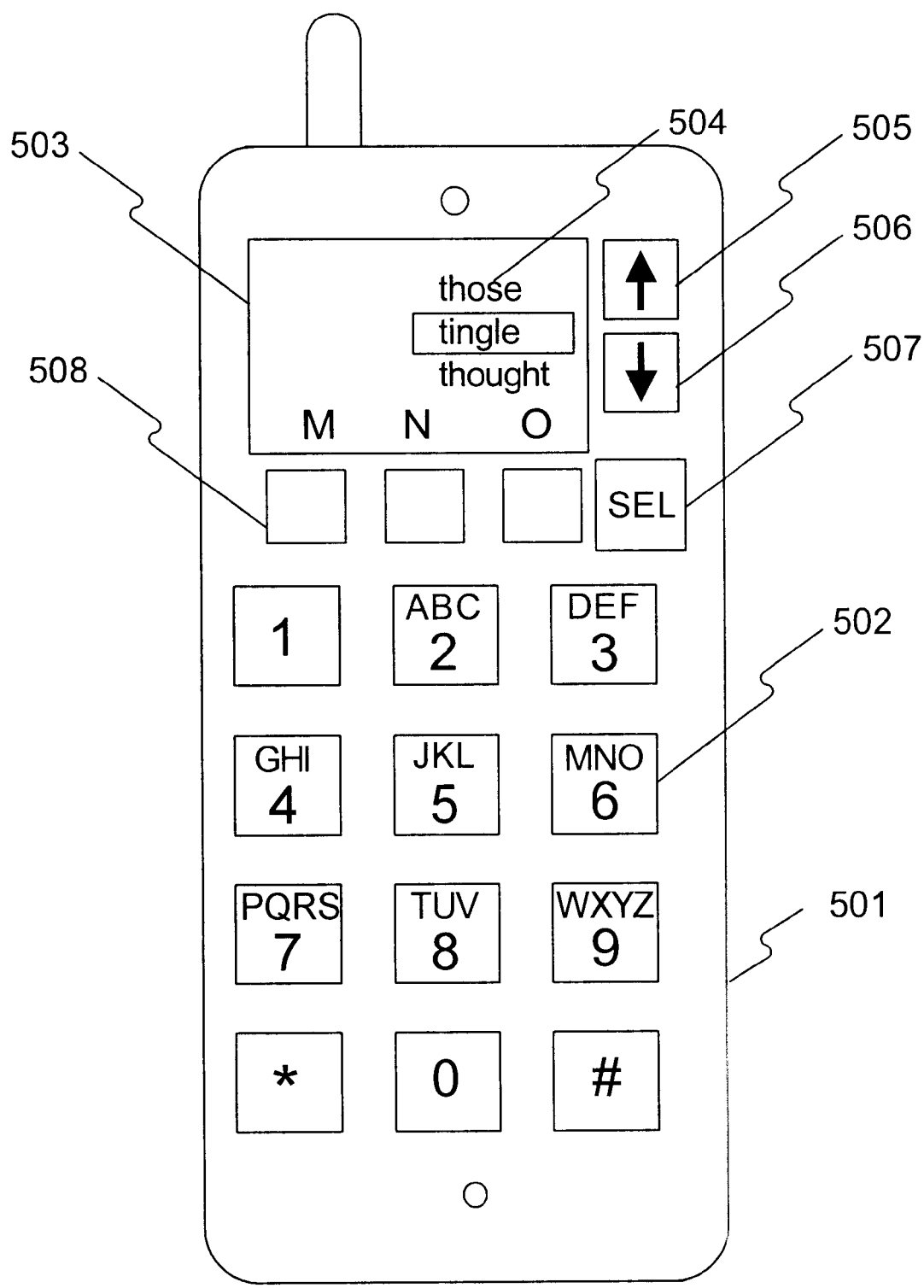
FIG. 5 shows the system for composing text as it would be embodied in a cellular telephone.

FIG. 5 shows the system for composing text as it would be embodied in a cellular telephone.

Cellular telephone 501 contains keys (e.g., the "6" key 502), and a display 503. Words are entered into the cellular telephone by pressing a sequence of keys that ambiguously designate a word. The words shown 504 are the result of pressing a key sequence "TUV", "GHI", and "MNO". Additional words can be viewed by using the arrow keys 505 and 506 to scroll through a list of words. When a desired word is displayed, the SEL key 507 is pressed to select it. In cases in which it is more efficient to disambiguate a letter group (e.g., "MNO") than to enter an additional ambiguous letter group, the letters in the best letter group to disambiguate are displayed next to keys (e.g., the "M" in display 503 is displayed next to the key 508). A user can then press one of the keys to disambiguate the letter group.

Figure 6:
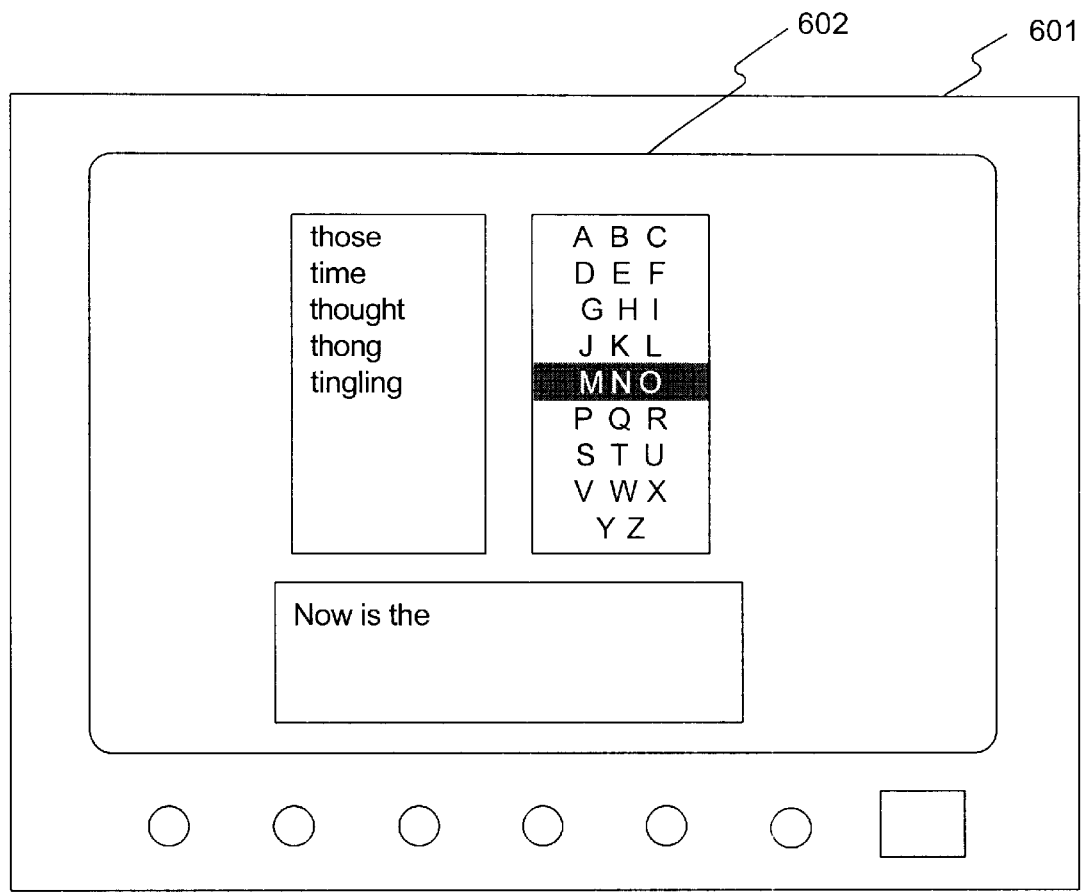
FIG. 6 shows the system for composing text as it would be embodied in a television display operated by a remote control.
Figure 6:
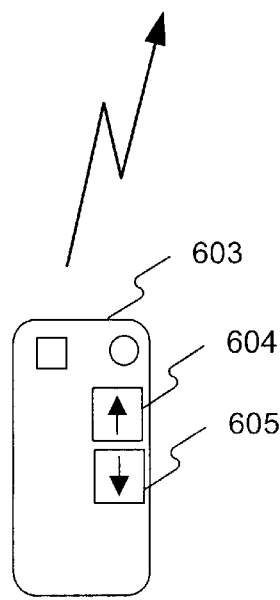

FIG. 6 shows the system for composing text as it would be embodied in a television display operated by a remote control. Shown is a television 601 with display 602 and a handheld device 603 with arrow keys 604 and 605. Pressing of the keys results in an infrared code being transmitted to the television set, which contains the microprocessor and memory with the dictionary. The approach is particularly useful for Web browsing.

Alternative Displays

Figure 7:
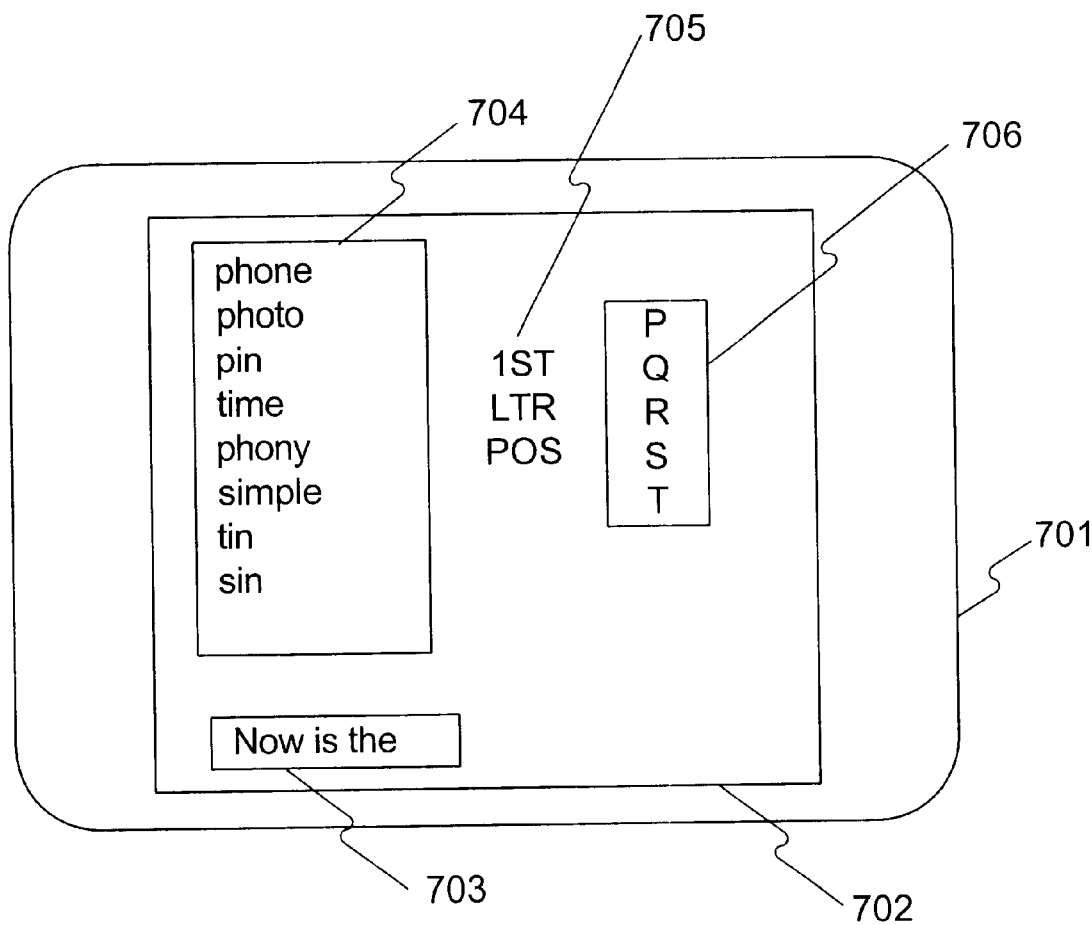
FIG. 7 shows a personal digital assistant with an alternative display in which the data input depends upon which is more efficient at a particular time.

FIG. 7 shows a personal digital assistant with an alternative display in which the data input depends upon which is more efficient at a particular time. Personal digital assistant 701 contains a display 702 that includes a field for accumulating text 703 and a list of words 704 to choose from. Not shown is a menu of ambiguous letter groups that are initially used to enter a sequence of such groups. This example indicates a situation in which a sequence of groups has been added and the system has determined that the most efficient next step is to disambiguate a previously entered letter group. The letter position 705 is indicated of this group, and a menu presented 706 to make this selection.

Other alternatives are available. The letter position indicator and the menu of unambiguous individual letters could be incorporated into the same menu as used for the ambiguous group letters, with how high up in the menu an indication of relative importance. Ambiguous group letter menu items can also adapt to the words remaining in the pool, with groups ordered in order of frequency of remaining words, and letters in a group removed if they are no longer relevant.

Auditory information is also useful, with an auditory indicator ("beep") indicating that a switch to unambiguous input desired. A distinctive auditory indicator (different from ordinary interactions) is desirable, and the number of sounds could indicate the letter position desired.

I claim:

1. A method for entering words into a computer system, comprising the steps of:

entering a sequence of two or more groups of characters into the computer system, each group ambiguously designating a character contained in a desired word;

displaying an indication that the desired word would be more efficiently found if a character in a group were unambiguously designated rather than an additional group of characters entered, should that determination be made.

2. The method of claim 1, wherein the indication suggesting an unambiguous designation comprises the display of a plurality of items, each item comprising a single character.

3. The method of claim 2, wherein the indication suggesting an unambiguous designation further comprises an indication of the magnitude of the increased efficiency resulting from unambiguously entering a single character rather than an ambiguous group of characters.

4. The method of claim 1, wherein the indication suggesting an unambiguous designation comprises an indication of the corresponding character position in the word.

5. The method of claim 1, wherein the determination that an unambiguous selection would be more efficient comprises the steps of:

calculating, for each letter position, a value of disambiguating the character group entered for that letter position;

selecting the letter position with the highest value in being disambiguated;

calculating a value of entering a new character group; and comparing the value of disambiguating the character group corresponding to the letter position with the highest value in being disambiguated with the value of entering a new character group.

6. The method of claim 5, wherein the value of disambiguating the character group entered for a letter position includes a bias value that reflects the additional effort required for disambiguating a letter position as opposed to entering a new character group.

7. The method of claim 1, wherein the word selected comprises a word in a natural language.

8. The method of claim 1, wherein the word selected comprises any meaningful sequence of characters defined in the system.

9. The method of claim 1, wherein the word selected represents the address of an entity in a computer system.

10. The method of claim 1, wherein the word selected comprises an electronic mail address.

11. An apparatus for entering text into a computer system, comprising:

a microprocessor;

an input mechanism that provides for entering a sequence of two or more groups of characters into the microprocessor, each group ambiguously designating a character contained in a desired word;

an alternate input mechanism that provides for entering an unambiguous single character selected from a group of characters into the microprocessor; and a display that displays an indication that the desired word would be more efficiently found if a character in a group were unambiguously designated rather than an additional group of characters entered, should that determination be made.

12. The apparatus of claim 11, wherein the indication suggesting an unambiguous designation comprises the display of a plurality of items, each item comprising a single character.

13. The apparatus of claim 11, wherein the indication suggesting an unambiguous designation further comprises an indication of the corresponding character position in the word.

14. The apparatus of claim 11, wherein the indication suggesting an unambiguous designation further comprises an indication of the magnitude of the increased efficiency resulting from unambiguously entering a single character rather than an ambiguous group of characters.

15. The apparatus of claim 11, wherein a pointing device is used to allow selection of a particular item.

16. The apparatus of claim 11, wherein a physical key is used to allow selection of a particular item.

17. The apparatus of claim 11, wherein the word selected represents the address of an entity in a computer system.

18. The apparatus of claim 11, wherein the word selected comprises an electronic mail address.

* * * * *